(12) United States Patent
Bruno

(10) Patent No.: US 9,197,330 B2
(45) Date of Patent: Nov. 24, 2015

(54) OPTICAL MONITORING IN A COMMUNICATIONS NETWORK ELEMENT

(75) Inventor: Gianmarco Bruno, Genoa (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 415 days.

(21) Appl. No.: 13/579,932

(22) PCT Filed: Feb. 26, 2010

(86) PCT No.: PCT/EP2010/052499
§ 371 (c)(1),
(2), (4) Date: Oct. 16, 2012

(87) PCT Pub. No.: WO2011/103930
PCT Pub. Date: Sep. 1, 2011

(65) Prior Publication Data
US 2013/0039646 A1   Feb. 14, 2013

(51) Int. Cl.
*H04B 10/85* (2013.01)
(52) U.S. Cl.
CPC ..................................... *H04B 10/85* (2013.01)
(58) Field of Classification Search
None
See application file for complete search history.

(56) References Cited

U.S. PATENT DOCUMENTS 5,159,481 A * 10/1992 Maeda .......................... 398/202

FOREIGN PATENT DOCUMENTS

| EP | 2 091 176 A1 | 8/2009 |
| JP | 7 154330 A | 6/1995 |
| WO | 2009/040144 A1 | 4/2009 |

OTHER PUBLICATIONS

Bruno, G.; Camera, M., "Securing optical monitoring ports of transmission network elements," Photonics Technologies, 2014 Fotonica AEIT Italian Conference on, vol., No., pp. 1,3, May 12-14, 2014.*
PCT International Search Report, mailed Dec. 6, 2010, in connection with International Application No. PCT/EP2010/052499.

(Continued)

*Primary Examiner* — Ken Vanderpuye
*Assistant Examiner* — Merlin Brito Peguero
(74) *Attorney, Agent, or Firm* — Leffler Intellectual Property Law, PLLC

(57) ABSTRACT

A communications network element comprises an input to receive an input optical signal having an input spectral property and carrying input traffic, an output and a monitoring port. Optical signal processing apparatus to receive the input signal and to form an output optical signal having an output spectral property and carrying output traffic. An optical splitter to tap off a part of one of the input signal and the output signal to form a tapped signal having a respective one of the input spectral property and input traffic, and the output spectral property and output traffic. Optical signal transforming apparatus to receive the tapped signal and to apply an optical transfer function (OTF) to it to form an optical monitoring signal, and to provide the monitoring signal to the monitoring port. The OTF preserves the spectral property of the tapped signal and applies a time-domain obfuscation to the tapped signal.

19 Claims, 9 Drawing Sheets

(56) References Cited

OTHER PUBLICATIONS

Etemad, S. et al. "An Overlay Photonic Layer Security Approach Scalable to 100 Gb/s" IEEE Communications Magazine, IEEE Service Center, Piscataway, US, vol. 46, No. 8, Aug. 1, 2008, pp. 32-39, XP011232708, ISSN: 0163-6804, DOI: 10.1109/MCOM.2008.4597101.

ITU-T G.697 Series G: Transmission Systems and Media, Digital Systems and Networks—Transmission media and optical systems characteristics—Characteristics of optical systems—Optical monitoring for dense wavelength division multiplexing systems, Nov. 2009.

ITU-T X.805 Series X: Data Networks and Open System Communications—Security—Security architecture for systems providing end-to-end communications, Oct. 2003.

Jung, Y. J. et al. "Demonstration of 10 Gbps, all-optical encryption and decryption system utilizing SOA XOR logic gates" Opt Quant Electron (2008) 40: pp. 425-430, DOI 10.1007/s11082-008-9224-7, Springer.

Annovazzi-Lodi, V. et al. "Message Encryption by Phase Modulation of a Chaotic Optical Carrier" IEEE Photonics Technology Letters, vol. 19, No. 2, pp. 76-78, Jan. 15, 2007.

* cited by examiner

Eye Diagram 10Gbit/s NRZ OSNR=14 dB, MMF length=0

Eye Diagram 10Gbit/s NRZ OSNR=14 dB, MMF length=1km

Eye Diagram 10Gbit/s NRZ OSNR=14 dB, MMF length=100, offset 30 um

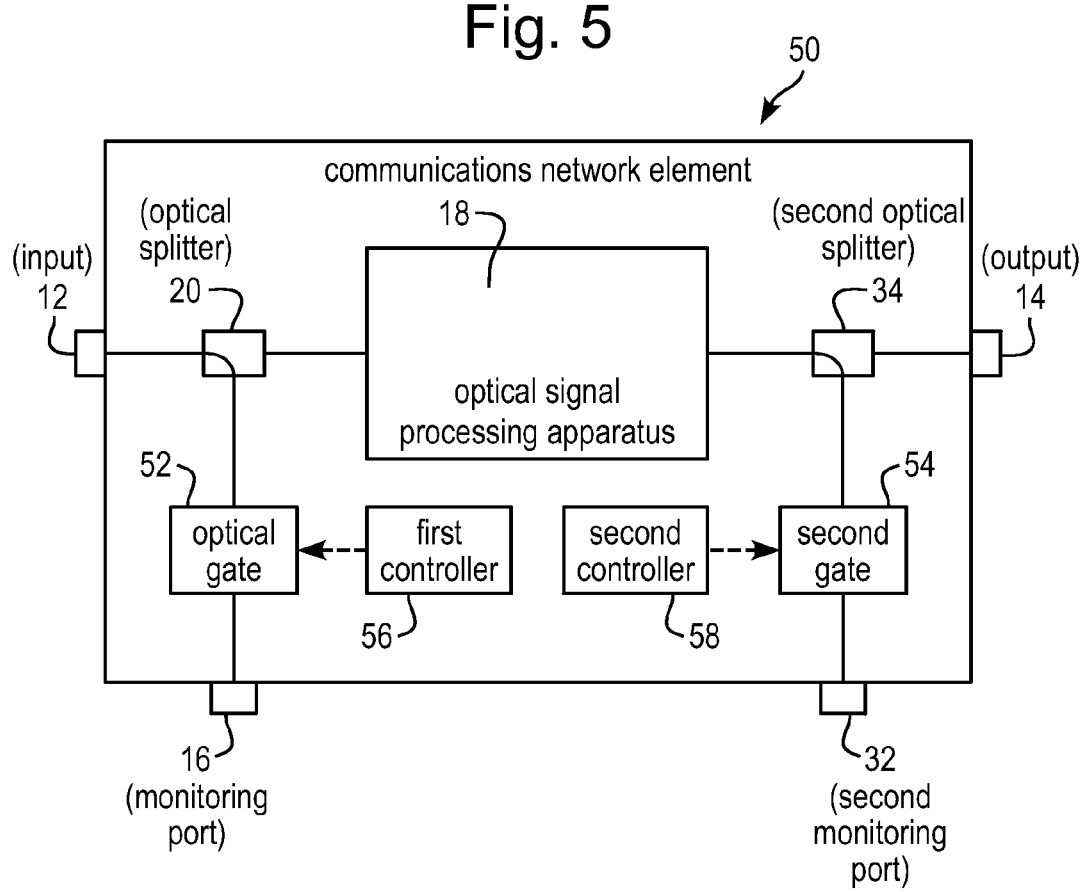

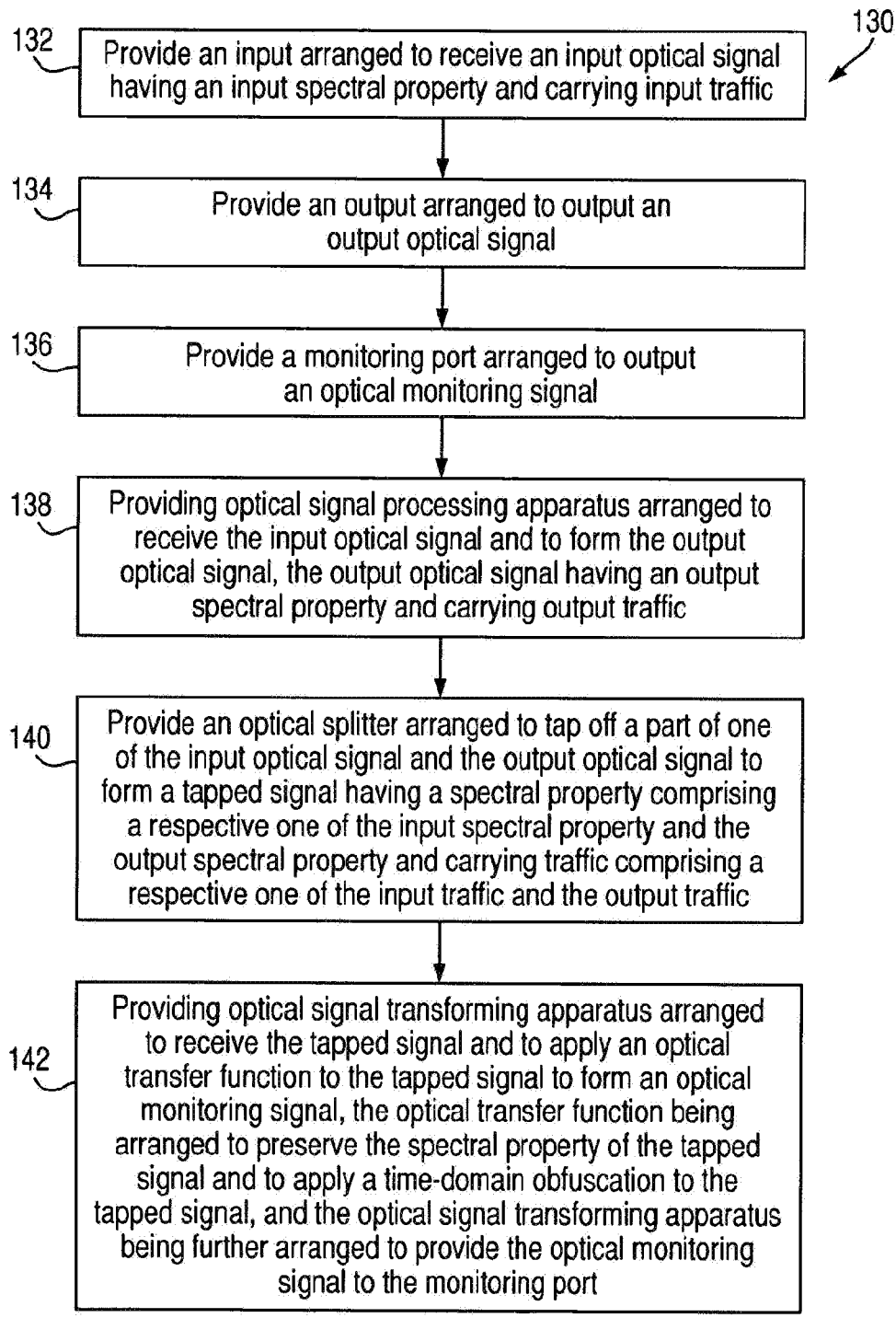

US 9,197,330 B2

OPTICAL MONITORING IN A COMMUNICATIONS NETWORK ELEMENT

TECHNICAL FIELD

The invention relates to a communications network element and to monitoring an optical signal in a communications network element.

BACKGROUND

Optical monitoring of optical signals is very important in ensuring the correct operation of optical communications networks. The relevant standard for optical monitoring is set out in the International Telecommunications Union document ITU-T G.697 "Optical monitoring for DWDM systems SERIES G: TRANSMISSION SYSTEMS AND MEDIA, DIGITAL SYSTEMS AND NETWORKS Transmission media characteristics—Characteristics of optical components and subsystems".

Optical monitoring points in a communications network typically comprise an optical splitter arranged to extract between 1% and 10% of the optical signal that is to be monitored, the extracted signal being provided to a monitoring port. All of the traffic carried by the optical signal being monitored is replicated in the extracted signal and is provided to the monitoring port. There is a resulting problem that live traffic is vulnerable to eavesdropping at the monitoring port and this presents a problem of communications network security.

International Telecommunications Union document ITU-T X.805 "Security architecture for systems providing end-to-end communications" sets out various optical protection schemes for making an optical connection secure against a fibre being cut to place an in-line tap for eavesdropping. However, the methods set out in ITU-T X.805 only monitor cuts in an optical communications network fibre link and are not able to detect eavesdropping of an optical signal via a monitoring port.

An alternative approach that has been proposed for providing communications security is optical encryption of the signals transmitted across an optical communications network, as proposed by Jung et al, "Demonstration of 10 Gbps all-optical encryption and decryption system utilizing SOA XOR logic gates", Optical and Quantum Electronics, vol. 40, no. 5-6, April 2008. A problem faced by optical encryption is that optical encryption and decryption devices are required for each wavelength channel at each transmitter and receiver within a communications network, raising the cost of the network.

SUMMARY

It is an object to provide an improved communications network element. It is a further object to provide an improved method of monitoring an optical signal in a communications network element. It is a further object to provide an improved method of manufacturing a communications network element.

A first aspect of the invention provides a communications network element comprising an input, an output, a monitoring port, optical signal processing apparatus, an optical splitter and optical signal transforming apparatus. The input is arranged to receive an input optical signal having an input spectral property and carrying input traffic. The output is arranged to output an output optical signal. The monitoring port is arranged to output an optical monitoring signal. The optical signal processing apparatus is arranged to receive the input optical signal and to form the output optical signal. The output optical signal has an output spectral property and carries output traffic. The optical splitter is arranged to tap off a part of one of the input optical signal and the output optical signal to form a tapped signal. The tapped signal has a spectral property comprising a respective one of the input spectral property and the output spectral property. The tapped signal carries traffic comprising a respective one of the input traffic and the output traffic. The optical signal transforming apparatus is arranged to receive the tapped signal and to apply an optical transfer function to the tapped signal to form an optical monitoring signal. The optical transfer function is arranged to preserve the spectral property of the tapped signal and to apply a time-domain obfuscation to the tapped signal. The optical signal transforming apparatus is further arranged to provide the optical monitoring signal to the monitoring port.

The communications network element is thus arranged so that an optical monitoring signal from an input optical signal or an output optical signal may be formed on which the traffic is obfuscated in the time-domain and in which a spectral property of the input optical signal or the output optical signal is preserved. The communications network element is thus arranged so that optical monitoring of the input optical signal or the output optical signal may be carried out while making it difficult or impossible for traffic on the input signal or the output signal to be intercepted by eavesdropping on the optical monitoring signal. The communications network element may be used to provide communications network security in the Infrastructure Security Layer, and may be used to provide Communication security for the Management Plane, as defined in ITU-T X.805, without requiring any knowledge of the traffic to be protected (as is needed for encryption based methods of communications security) and without requiring any passwords or authentication mechanisms.

The communications network element to be used with any modulation format and bit-rates of up to 100 Gbit/s and more. Applying a time-domain obfuscation may allow the communications network element to be used with an input optical signal or an output optical signal comprising a plurality of optical channels. The communications network element may therefore be used to form an optical monitoring signal for all of the optical channels in a wavelength division multiplexed (WDM) optical signal.

In an embodiment, the input spectral property and the output spectral property comprises one of optical power, power spectral density, wavelength, frequency, and optical signal-to-noise ratio. An optical monitoring signal may therefore be provided on which optical monitoring be performed by measuring optical power or by making a frequency-domain measurement.

In an embodiment, the optical signal transforming apparatus comprises an all-optical device arranged to apply the optical transfer function. The time-domain obfuscation may therefore be applied in the optical domain without requiring transformation out of the optical domain, which may reduce opportunities for eavesdropping of the traffic on the tapped signal.

In an embodiment, the optical signal transforming apparatus is arranged to apply one of intermodal dispersion, chromatic dispersion and polarisation mode dispersion to the tapped signal. Applying intermodal dispersion may produce minimal disturbance of the spectral properties of a tapped optical signal, preserving the optical power, power spectral density, wavelength, frequency and optical signal-to-noise ratio of the tapped signal, while increasing the bit error rate (BER) and thereby obfuscating the traffic. The resulting modal dispersion may not be recovered by a dispersion compensator for single-mode optical fibre, and it may therefore be extremely difficult or impossible to recover the traffic on the optical monitoring signal. Applying chromatic dispersion or polarization mode dispersion may preserve the power spectral density of the tapped signal, allowing the presence or absence of an optical channel of the tapped signal to be determined, and, if present, the wavelength, optical power and optical signal-to-noise ratio of a channel.

In an embodiment, the optical signal transforming apparatus comprises a multimode optical fibre arranged to apply intermodal dispersion to the tapped signal. This may provide an optical signal transforming apparatus which is a passive optical element requiring no external control, and having low and known insertion loss, small size and low cost. In an embodiment, the multimode optical fibre is arranged to receive the tapped signal at an offset launch arranged to maximise the intermodal dispersion to be applied to the tapped signal. The amount of intermodal dispersion applied to the tapped signal may therefore be controlled and maximized, to control and maximize the time-domain obfuscation that is applied.

In an embodiment, the optical signal transforming apparatus comprises an optical fibre having one of high chromatic dispersion and high polarization mode dispersion.

In an embodiment, the optical signal transforming apparatus comprises an optical gate arranged to selectively gate the tapped signal. In an embodiment, the optical gate is arranged to gate the tapped signal for a measurement time and to block the tapped signal for blocked time, the measurement time being a proportion of the blocked time. The tapped signal may therefore only be gated for a small portion of the time during which the tapped signal is received at the gate. By gating the tapped signal using a measurement time that allows the tapped signal to be passed for only a small portion of the time, the traffic may be rendered unrecoverable.

In an embodiment, the traffic has a signal symbol duration and the optical gate is arranged to selectively gate the tapped signal for a measurement time which is larger than the signal symbol duration. All of the spectral properties of the tapped signal may be preserved because the measurement time may be set to be much larger than the signal symbol duration.

In an embodiment, the optical gate comprises an optical switch and a controller arranged to provide a chopping signal to the optical switch.

In an embodiment, the communications network element further comprises monitoring apparatus arranged to receive the monitoring signal. The monitoring apparatus is arranged to synchronize itself with the optical gate by monitoring one of a presence and an absence of the monitoring signal. No additional control apparatus may be required to trigger the monitoring apparatus to measure the optical monitoring signal.

In an embodiment, the optical signal transforming apparatus comprises a nonlinear optical element arranged to apply a nonlinear optical effect to the tapped signal. In an embodiment, the nonlinear optical effect comprises one of the Kerr effect and Brillouin scattering. In an embodiment, the spectral property comprises wavelength. A channel wavelength may therefore be retained and the optical monitoring signal may be used for channel detection or channel counting.

In an embodiment, where the nonlinear optical effect comprises the Kerr effect the spectral property may alternatively comprise one of optical power and optical signal-to-noise ratio. The optical monitoring signal may therefore be used to measure optical power and optical signal-to-noise ratio, specifically channel power and optical signal-to-noise ratio.

In an embodiment, the communications network element further comprises a further monitoring port, a further optical splitter and further optical signal transforming apparatus. The further monitoring port is arranged to output a further optical monitoring signal. The optical splitter is arranged to tap off a part of the input optical signal to form a tapped signal and the further optical splitter is arranged to tap off a part of the output optical signal to form a further tapped signal. The tapped signal has a spectral property comprising the input spectral property and the further tapped signal has a spectral property comprising the output spectral property. The tapped signal carries traffic comprising the input traffic and the further tapped signal carries traffic comprising the output traffic. The further optical signal transforming apparatus is arranged to receive the further tapped signal and to apply an optical transfer function as described above to the further tapped signal to form a further optical monitoring signal. The optical signal transforming apparatus is arranged to provide the optical monitoring signal to the monitoring port. The further optical signal transforming apparatus is arranged to provide the further optical monitoring signal to the further monitoring port.

Both the input optical signal and the output optical signal can thus be monitored as described above while preserving the security of the traffic on the respective tapped signals.

In an embodiment, the optical signal processing apparatus comprises one of an optical amplifier, an optical leveller, a switch, a router, optical dispersion compensation apparatus, an optical multiplexer and an optical demultiplexer.

A second aspect of the invention provides a method of monitoring an optical signal in a communications network element. The method comprises receiving an optical signal having a spectral property and carrying traffic. A part of the optical signal is split off to form a tapped signal having the spectral property and carrying the traffic. An optical transfer function is applied to the tapped signal to form an optical monitoring signal. The optical transfer function is arranged to preserve the signal property of the tapped signal and to apply a time-domain obfuscation to the tapped signal. The optical monitoring signal is provided to a monitoring port of the communications network element.

The method may therefore enable an optical monitoring signal from an input optical signal or an output optical signal to be formed on which the traffic is obfuscated in the time-domain and in which a spectral property of the input optical signal or the output optical signal is preserved. The method may enable optical monitoring of the input optical signal or the output optical signal to be carried out while making it difficult or impossible for traffic on the input signal or the output signal to be intercepted by eavesdropping on the optical monitoring signal. The method may be used to provide communications network security in the Infrastructure Security Layer, and may be used to provide Communication security for the Management Plane, as defined in ITU-T X.805, without requiring any knowledge of the traffic to be protected (as is needed for encryption based methods of communications security) and without requiring any passwords or authentication mechanisms.

The method may be applied to an optical signal of any modulation format and bit-rates of up to 100 Gbit/s and more. Applying a time-domain obfuscation may allow the method to be applied an input optical signal or an output optical signal comprising a plurality of optical channels. The method may therefore be used to monitor all of the optical channels in a wavelength division multiplexed (WDM) optical signal.

In an embodiment, the spectral property comprises one of optical power, power spectral density, wavelength, frequency, and optical signal-to-noise ratio. Optical monitoring may therefore be performed by measuring optical power or by making a frequency-domain measurement.

In an embodiment, the optical transfer function is applied by transmitting the tapped signal through an all-optical device arranged to apply the optical transfer function. The time-domain obfuscation may therefore be applied in the optical domain without requiring transformation out of the optical domain, which may reduce opportunities for eavesdropping of the traffic on the tapped signal.

In an embodiment, applying the optical transfer function comprises applying one of intermodal dispersion, chromatic dispersion and polarisation mode dispersion to the tapped signal. Applying intermodal dispersion may produce minimal disturbance of the spectral properties of a tapped optical signal, preserving the optical power, power spectral density, wavelength, frequency and optical signal-to-noise ratio of the tapped signal, while increasing the bit error rate (BER) and thereby obfuscating the traffic. The resulting modal dispersion may not be recovered by a dispersion compensator for single-mode optical fibre, and it may therefore be extremely difficult or impossible to recover the traffic on the optical monitoring signal. Applying chromatic dispersion or polarization mode dispersion may preserve the power spectral density of the tapped signal, allowing the presence or absence of an optical channel of the tapped signal to be determined, and, if present, the wavelength, optical power and optical signal-to-noise ratio of a channel.

In an embodiment, the intermodal dispersion is applied by transmitting the tapped signal through a multimode optical fibre arranged to apply intermodal dispersion to the tapped signal. Intermodal dispersion may therefore be applied by means of a passive optical element requiring no external control, and having low and known insertion loss, small size and low cost. In an embodiment, the tapped signal is offset launched into multimode optical fibre, the offset being arranged to maximise the intermodal dispersion to be applied to the tapped signal. The amount of intermodal dispersion applied to the tapped signal may therefore be controlled and maximized, to control and maximize the time-domain obfuscation that is applied.

In an embodiment, applying the optical transfer function comprises selectively gating the tapped signal. In an embodiment, the tapped signal is gated for a measurement time and blocked for a blocked time, the measurement time being a proportion of the blocked time. The tapped signal may therefore only be gated for a small portion of the time during which the tapped signal is received at the gate. By gating the tapped signal using a measurement time that allows the tapped signal to be passed for only a small portion of the time, the traffic may be rendered unrecoverable.

In an embodiment, the traffic has a signal symbol duration and the tapped signal is gated for a measurement time which is larger than the signal symbol duration. All of the spectral properties of the tapped signal may be preserved because the measurement time may be set to be much larger than the signal symbol duration.

In an embodiment, the method further comprises receiving the optical monitoring signal at monitoring apparatus, the monitoring apparatus being arranged to synchronize itself with the gating by monitoring one of a presence and an absence of the optical monitoring signal.

In an embodiment, applying the optical transfer function comprises applying a nonlinear optical effect to the tapped signal. In an embodiment, the nonlinear optical effect comprises one of the Kerr effect and Brillouin scattering. In an embodiment, the spectral property comprises wavelength. A channel wavelength may therefore be retained and the optical monitoring signal may be used for channel detection or channel counting.

In an embodiment, where the nonlinear optical effect comprises the Kerr effect the spectral property may alternatively comprise one of optical power and optical signal-to-noise ratio. The optical monitoring signal may therefore be used to measure optical power and optical signal-to-noise ratio, specifically channel power and optical signal-to-noise ratio.

In an embodiment, the method further comprises receiving a further optical signal having a further spectral property and carrying further traffic. A part of the further optical signal is split off to form a further tapped signal having the further spectral property and carrying the further traffic. A further optical transfer function is applied to the further tapped signal to form a further optical monitoring signal. The further optical transfer function is arranged to preserve the further signal property of the further tapped signal and to apply a time-domain obfuscation to the further tapped signal. A further optical monitoring signal is provided to a further monitoring port of the communications network element.

Two optical signals can thus be monitored as described above while preserving the security of the traffic on the respective tapped signals.

In an embodiment, the optical signal comprises an input optical signal and the further optical signal comprises an output optical signal. Both input and output optical signals can thus be monitored as described above while preserving the security of the traffic on the respective tapped signals.

A third aspect of the invention provides a data carrier having computer readable instructions embodied therein. The said computer readable instructions are for providing access to resources available on a processor and comprising instructions to cause the processor to cause an optical transfer function to be applied to a tapped optical signal to form an optical monitoring signal. The tapped optical signal has a spectral property and carries traffic. The optical transfer function is arranged to preserve the spectral property of the tapped signal and to apply a time-domain obfuscation to the tapped signal.

A processor may therefore be controlled to cause an optical transfer function to be applied to a tapped optical signal on which the traffic is obfuscated in the time-domain and in which a spectral property of the tapped optical signal is preserved. An optical monitoring signal may thus be provided while making it difficult or impossible for traffic on the tapped signal to be intercepted by eavesdropping on the optical monitoring signal. The optical transfer function may be used to provide communications network security in the Infrastructure Security Layer, and may be used to provide Communication security for the Management Plane, as defined in ITU-T X.805, without requiring any knowledge of the traffic to be protected (as is needed for encryption based methods of communications security) and without requiring any passwords or authentication mechanisms.

The optical transfer function may be applied to a tapped optical signal having any modulation format and bit-rates of up to 100 Gbit/s and more. Applying a time-domain obfuscation may allow the optical transfer function to be applied to a tapped optical signal comprising a plurality of optical channels. The optical transfer function may therefore be applied to form an optical monitoring signal for all of the optical channels in a wavelength division multiplexed (WDM) optical signal.

In an embodiment, the spectral property comprises one of optical power, power spectral density, wavelength, frequency, and optical signal-to-noise ratio. An optical monitoring signal may therefore be provided on which optical monitoring be performed by measuring optical power or by making a frequency-domain measurement.

In an embodiment, the optical transfer function is applied by transmitting the tapped signal through an all-optical device arranged to apply the optical transfer function. The time-domain obfuscation may therefore be applied in the optical domain without requiring transformation out of the optical domain, which may reduce opportunities for eavesdropping of the traffic on the tapped signal.

In an embodiment, applying the optical transfer function comprises applying one of intermodal dispersion, chromatic dispersion and polarisation mode dispersion to the tapped signal. Applying intermodal dispersion may produce minimal disturbance of the spectral properties of a tapped optical signal, preserving the optical power, power spectral density, wavelength, frequency and optical signal-to-noise ratio of the tapped signal, while increasing the bit error rate (BER) and thereby obfuscating the traffic. The resulting modal dispersion may not be recovered by a dispersion compensator for single-mode optical fibre, and it may therefore be extremely difficult or impossible to recover the traffic on the optical monitoring signal. Applying chromatic dispersion or polarization mode dispersion may preserve the power spectral density of the tapped signal, allowing the presence or absence of an optical channel of the tapped signal to be determined, and, if present, the wavelength, optical power and optical signal-to-noise ratio of a channel.

In an embodiment, applying the optical transfer function comprises selectively gating the tapped signal.

In an embodiment, the tapped signal is gated for a measurement time and blocked for a blocked time, the measurement time being a proportion of the blocked time. The tapped signal may therefore only be gated for a small portion of the time during which the tapped signal is received at the gate. By gating the tapped signal using a measurement time that allows the tapped signal to be passed for only a small portion of the time, the traffic may be rendered unrecoverable.

In an embodiment, the traffic has a signal symbol duration and the tapped signal is selectively gated for a measurement time which is larger than the signal symbol duration. All of the spectral properties of the tapped signal may be preserved because the measurement time may be set to be much larger than the signal symbol duration.

A fourth aspect of the invention provides a method of manufacturing a communications network element. The method comprises providing an input arranged to receive an input optical signal having an input spectral property and carrying input traffic. An output arranged to output an output optical signal is provided. A monitoring port arranged to output an optical monitoring signal is provided. Optical signal processing apparatus is provided. The optical signal processing apparatus is arranged to receive the input optical signal and to form the output optical signal. The output optical signal has an output spectral property and carries output traffic. An optical splitter is provided arranged to tap off a part of one of the input optical signal and the output optical signal to form a tapped signal. The tapped signal has a spectral property comprising a respective one of the input spectral property and the output spectral property. The tapped signal carries traffic comprising a respective one of the input traffic and the output traffic. Optical signal transforming apparatus is provided arranged to receive the tapped signal and to apply an optical transfer function to the tapped signal to form an optical monitoring signal. The optical transfer function is arranged to preserve the spectral property of the tapped signal and to apply a time-domain obfuscation to the tapped signal. The optical signal transforming apparatus is further arranged to provide the optical monitoring signal to the monitoring port.

A communications network element may thus be provided in which an optical monitoring signal from an input optical signal or an output optical signal may be formed on which the traffic is obfuscated in the time-domain and in which a spectral property of the input optical signal or the output optical signal is preserved. A communications network element may thus be provided in which optical monitoring of the input optical signal or the output optical signal may be carried out while making it difficult or impossible for traffic on the input signal or the output signal to be intercepted by eavesdropping on the optical monitoring signal. A communications network element may thus be provided which may be used to provide communications network security in the Infrastructure Security Layer, and which may be used to provide Communication security for the Management Plane, as defined in ITU-T X.805, without requiring any knowledge of the traffic to be protected (as is needed for encryption based methods of communications security) and without requiring any passwords or authentication mechanisms.

A communications network element may thus be provided which may be used with any modulation format and bit-rates of up to 100 Gbit/s and more. Arranging the communications network element to apply a time-domain obfuscation may allow the communications network element to be used with an input optical signal or an output optical signal comprising a plurality of optical channels. A communications network element may therefore be provided which may be used to form an optical monitoring signal for all of the optical channels in a wavelength division multiplexed (WDM) optical signal.

In an embodiment, the input spectral property and the output spectral property comprise one of optical power, power spectral density, wavelength, frequency, and optical signal-to-noise ratio. A communications network element may therefore be provided which is able to provide an optical monitoring signal on which optical monitoring be performed by measuring optical power or by making a frequency-domain measurement.

In an embodiment, the optical signal transforming apparatus comprises an all-optical device arranged to apply the optical transfer function. A communications network element may thus be provided in which the time-domain obfuscation may be applied in the optical domain without requiring transformation out of the optical domain, which may reduce opportunities for eavesdropping of the traffic on the tapped signal.

In an embodiment, the optical signal transforming apparatus is arranged to apply one of intermodal dispersion, chromatic dispersion and polarisation mode dispersion to the tapped signal. Arranging the optical signal transforming apparatus to apply intermodal dispersion may provide a communications network element in which minimal disturbance of the spectral properties of a tapped optical signal is caused, preserving the optical power, power spectral density, wavelength, frequency and optical signal-to-noise ratio of the tapped signal, while increasing the bit error rate (BER) and thereby obfuscating the traffic on the tapped signal. The resulting modal dispersion may not be recovered by a dispersion compensator for single-mode optical fibre, and it may therefore be extremely difficult or impossible to recover the traffic on the optical monitoring signal produced by the communications network element. Applying chromatic dispersion or polarization mode dispersion may preserve the power spectral density of the tapped signal, allowing the presence or absence of an optical channel of the tapped signal to be determined, and, if present, the wavelength, optical power and optical signal-to-noise ratio of a channel.

In an embodiment, the optical signal transforming apparatus comprises a multimode optical fibre arranged to apply intermodal dispersion to the tapped signal. This may provide an optical signal transforming apparatus which is a passive optical element requiring no external control, and having low and known insertion loss, small size and low cost. In an embodiment, the multimode optical fibre is arranged to receive the tapped signal at an offset launch arranged to maximise the intermodal dispersion to be applied to the tapped signal. The amount of intermodal dispersion applied to the tapped signal may therefore be controlled and maximized, to control and maximize the time-domain obfuscation that is applied.

In an embodiment, the optical signal transforming apparatus comprises an optical fibre having one of high chromatic dispersion and high polarization mode dispersion.

In an embodiment, the optical signal transforming apparatus comprises an optical gate arranged to selectively gate the tapped signal. In an embodiment, the optical gate is arranged to gate the tapped signal for a measurement time and to block the tapped signal for blocked time, the measurement time being a proportion of the blocked time. The tapped signal may therefore only be gated for a small portion of the time during which the tapped signal is received at the gate. By arranging the gate to gate the tapped signal using a measurement time that allows the tapped signal to be passed for only a small portion of the time, the traffic may be rendered unrecoverable.

In an embodiment, the traffic has a signal symbol duration and the optical gate is arranged to selectively gate the tapped signal for a measurement time which is larger than the signal symbol duration. All of the spectral properties of the tapped signal may be preserved because the measurement time may be set to be much larger than the signal symbol duration.

In an embodiment, the optical gate comprises an optical switch and a controller arranged to provide a chopping signal to the optical switch.

In an embodiment, the method further comprises providing monitoring apparatus arranged to receive the monitoring signal. The monitoring apparatus is arranged to synchronize itself with the optical gate by monitoring one of a presence and an absence of the monitoring signal. No additional control apparatus may be required to trigger the monitoring apparatus to measure the optical monitoring signal.

In an embodiment, the optical signal transforming apparatus comprises a nonlinear optical element arranged to apply a nonlinear optical effect to the tapped signal. In an embodiment, the nonlinear optical effect comprises one of the Kerr effect and Brillouin scattering. In an embodiment, the spectral property comprises wavelength. The communications network element may thus be arranged to retain a channel wavelength and the optical monitoring signal may be used for channel detection or channel counting.

In an embodiment, where the nonlinear optical effect comprises the Kerr effect the spectral property may alternatively comprise one of optical power and optical signal-to-noise ratio. The optical monitoring signal may therefore be used to measure optical power and optical signal-to-noise ratio, specifically channel power and optical signal-to-noise ratio.

In an embodiment, the method further comprises providing a further monitoring port, a further optical splitter and further optical signal transforming apparatus. The further monitoring port is arranged to output a further optical monitoring signal. The optical splitter is arranged to tap off a part of the input optical signal to form a tapped signal and the further optical splitter is arranged to tap off a part of the output optical signal to form a further tapped signal. The tapped signal has a spectral property comprising the input spectral property and the further tapped signal has a spectral property comprising the output spectral property. The tapped signal carries traffic comprising the input traffic and the further tapped signal carries traffic comprising the output traffic. The further optical signal transforming apparatus is arranged to receive the further tapped signal and to apply an optical transfer function as described above to the further tapped signal to form a further optical monitoring signal. The optical signal transforming apparatus is arranged to provide the optical monitoring signal to the monitoring port. The further optical signal transforming apparatus is arranged to provide the further optical monitoring signal to the further monitoring port.

A communications network element may thus be provided in which the input optical signal and the output optical signal can both be monitored while preserving the security of the traffic on the respective tapped signals.

In an embodiment, the optical signal processing apparatus comprises one of an optical amplifier, an optical leveller, a switch, a router, optical dispersion compensation apparatus, an optical multiplexer and an optical demultiplexer.

Traffic is used herein to mean a modulation of the optical signal in the time-domain, the optical signal thereby carrying data or other information.

BRIEF DESCRIPTION OF THE DRAWINGS

FIG. 5 is a diagrammatic representation of a communications network element according to a fourth embodiment of the invention;

FIG. 12 shows the steps of a method of manufacturing a communications network element according to an eleventh embodiment of the invention.

DETAILED DESCRIPTION

Figure 1:
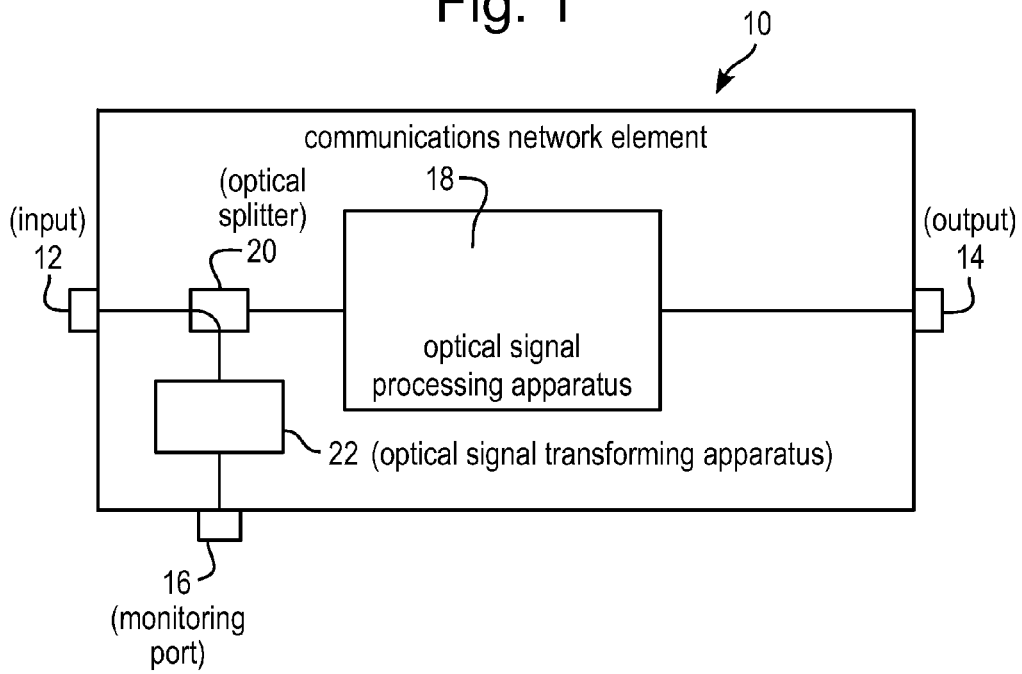
FIG. 1 is a diagrammatic representation of a communications network element according to a first embodiment of the invention.

Referring to FIG. 1, a first embodiment of the invention provides a communications network element 10 comprising an input 12, an output 14, a monitoring port 16, optical signal processing apparatus 18, an optical splitter 20 and optical signal transforming apparatus 22.

The input 12 is arranged to receive an input optical signal having an input spectral property and carrying input traffic. The output 14 is arranged to output an output optical signal. The monitoring port 16 is arranged to output an optical monitoring signal. The optical signal processing apparatus 18 is arranged to receive the input optical signal and to form the output optical signal. The resulting output optical signal has an output spectral property and carries output traffic. The optical signal processing apparatus 18 may comprise any such apparatus at which it is desirable to monitor the input optical signal or the output optical signal. The optical signal processing apparatus 18 may be selected from, but is not limited to, one of an optical amplifier, an optical leveller, a switch, a wavelength selective switch, a router, optical dispersion compensation apparatus, an optical multiplexer and an optical de-multiplexer.

The optical splitter 20 is arranged, in this example, to tap off a part of the input optical signal to form a tapped signal. The tapped signal has a spectral property comprising the input spectral property and carries traffic comprising the input traffic. The tapped signal therefore replicates the spectral property and traffic of the input optical signal. It will be appreciated that the optical splitter 20 may alternatively be provided on the other side of the optical signal processing apparatus 18, arranged to tap off a part of the output optical signal to form the tapped signal, which would then have the output spectral property and carry the output traffic.

The optical signal transforming apparatus 22 is arranged to receive the tapped signal and to apply an optical transfer function (OTF) to the tapped signal to form an optical monitoring signal. The OTF is arranged to preserve the spectral property of the tapped signal and to apply a time-domain obfuscation to the tapped signal. An optical monitoring signal is thereby formed which has the spectral property of the tapped signal and on which the traffic carried by the tapped signal has been obfuscated in the time-domain. The optical signal transforming apparatus 22 is further arranged to provide the optical monitoring signal to the monitoring port 16.

Figure 2:
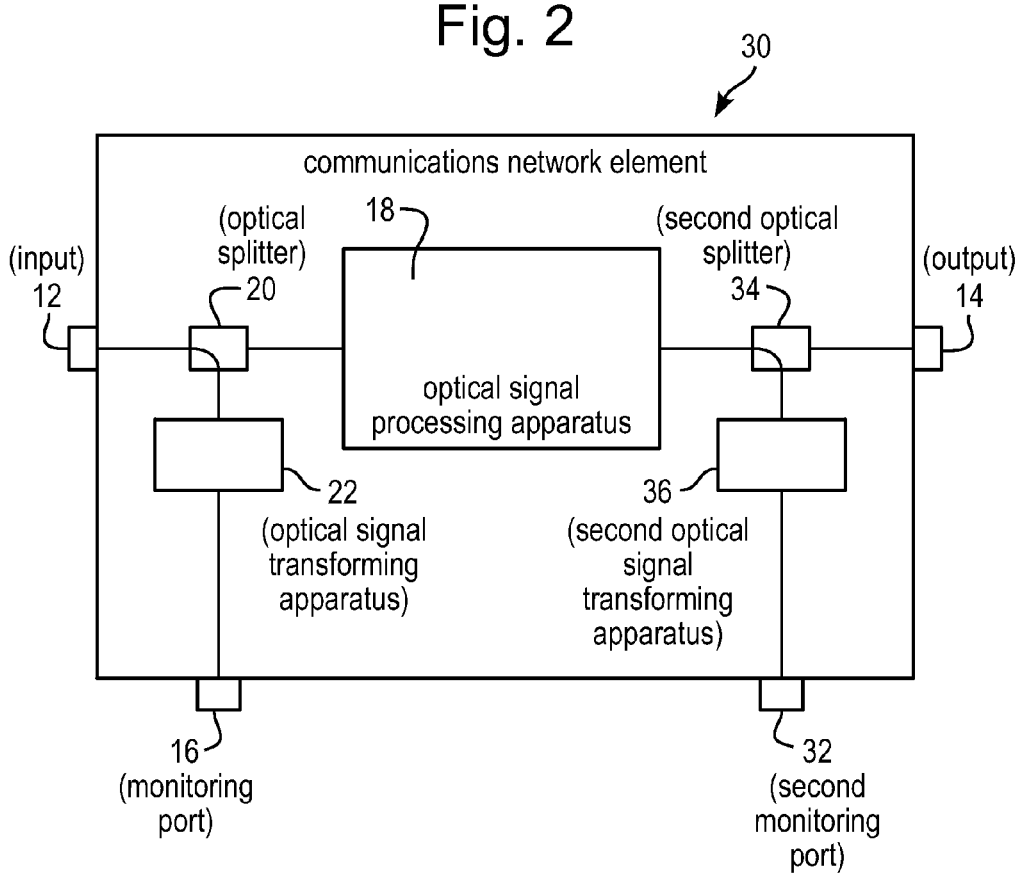
FIG. 2 is a diagrammatic representation of a communications network element according to a second embodiment of the invention.

A second embodiment of the invention provides a communications network element 30, as shown in FIG. 2. The communications network element 30 is substantially the same as the communications network element 10 of FIG. 1, with the following modifications. The same reference numbers are retained for corresponding features.

In this embodiment, the communications network element 30 further comprises a second optical splitter 34, provided on the output side of the optical signal processing apparatus 18. A second optical signal transforming apparatus 36 and a second monitoring port 32 are also provided. The second optical splitter 34 is arranged to tap off a part of the output optical signal, to form a second tapped signal having the output spectral property and carrying the output traffic. The second optical signal transforming apparatus 36 is arranged to receive the second tapped signal and to apply a second OTF to the second tapped signal to form a second optical monitoring signal. The second OTF is arranged to preserve the spectral property of the second tapped signal and to apply a time-domain obfuscation to the second tapped signal. The second optical signal transforming apparatus 36 is further arranged to provide the second optical monitoring signal to the second monitoring port 32.

The communications network element 30 is thus arranged to allow optical monitoring signals to be provided from both the input optical signal and the output optical signal.

Figure 3:
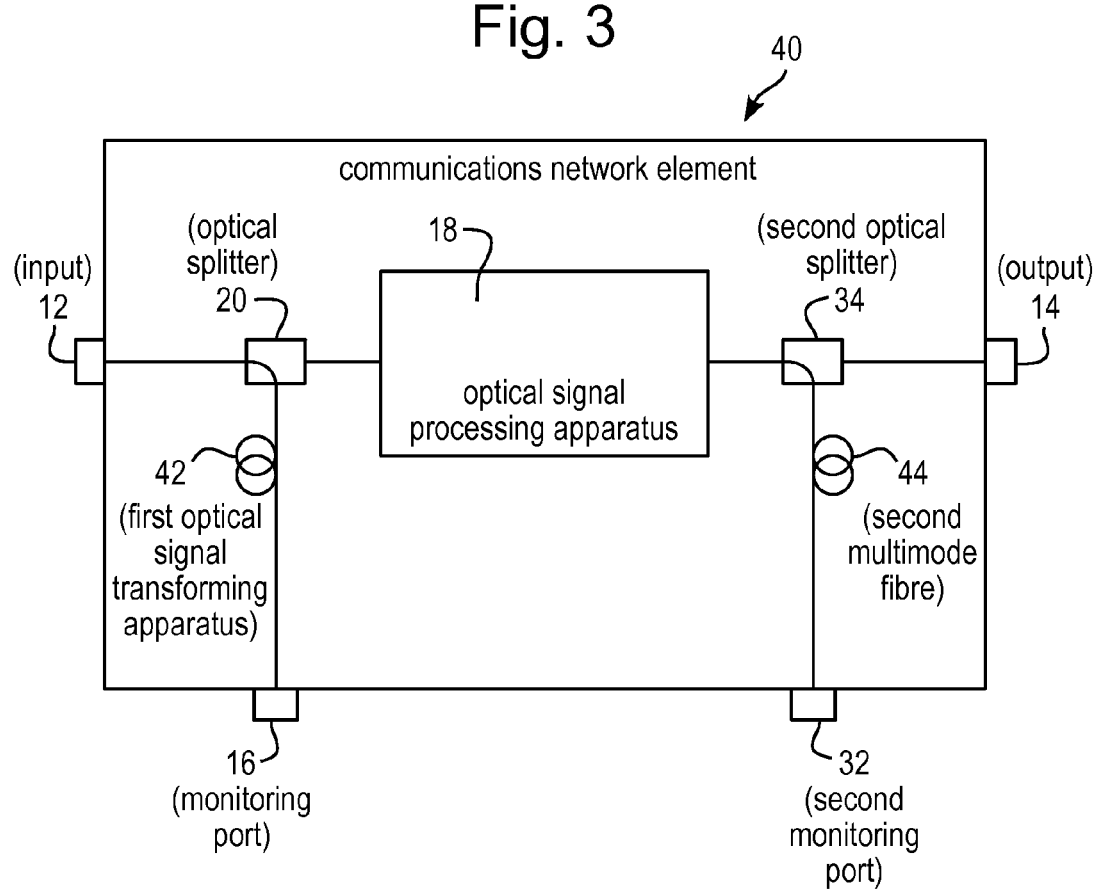
FIG. 3 is a diagrammatic representation of a communications network element according to a third embodiment of the invention.

FIG. 3 shows a communications network element 40 according to a third embodiment of the invention. The communications network element 40 is substantially the same as the communications network element 30 of FIG. 2, with the following modifications. The same reference numbers are retained for corresponding features.

In this embodiment the first optical signal transforming apparatus 42 comprises a 1 km length of multimode fibre arranged to receive a first tapped signal from the first optical splitter 20. The multimode fibre has a diameter of 62.5 μm. The multimode fibre 42 is arranged to apply intermodal dispersion to the first tapped signal, thereby applying a time-domain obfuscation to the traffic carried by the first tapped signal. The intermodal dispersion applied to the first tapped signal causes the traffic to become significantly degraded. Transmission of the first tapped signal through the first multimode fibre 42 occurs without affecting the optical power, wavelength or optical signal-to-noise ratio (OSNR) of the first tapped signal. The resulting optical monitoring signal is delivered to the first monitoring port 16 and may be used to monitor the signal power, channel wavelength and OSNR of the input optical signal.

The second optical signal transforming apparatus comprises a second multimode fibre 44, of the same type as the first multimode fibre 42 which applies the same optical transfer function to the second tapped signal to produce a second optical monitoring signal.

Figure 4A:
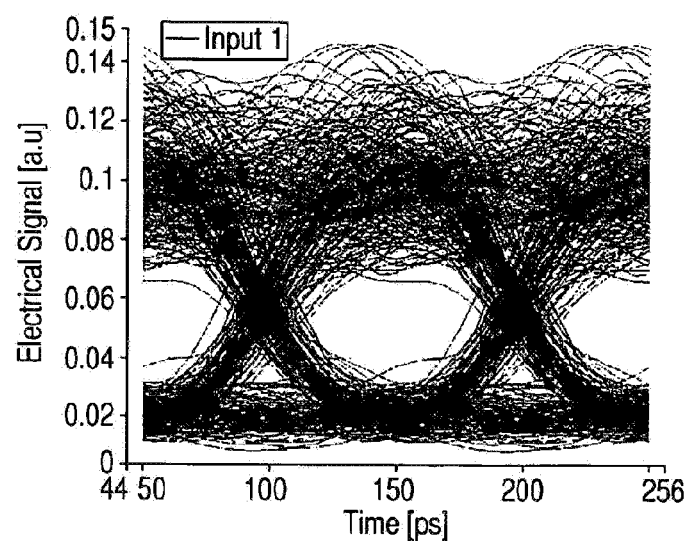
FIG. 4 shows a) the optical spectrum of a 10 Gbit/s 1550 nm NRZ signal modulated at 193.4 THz; and the eye diagrams for b) back-to-back fibre; b) where the optical signal transforming apparatus comprises 1 km of multimode fibre, no offset launch; and c) where the optical signal transforming apparatus comprises 100 m of multimode fibre, offset launch of 30 µm.

Each of the multimode fibres 42, 44 may be modified so that the respective tapped signal is offset launched into the multimode fibre 42, 44, with the offset launch being selected to maximize the intermodal dispersion applied to the respective tapped signal. In this example, a 100 m length of the same multimode fibre is used with an offset launch of 30 μm. Transmission of a tapped signal through multimode fibre 42, 44 causes the traffic carried by the tapped signal to be completely degradeed, so that a tapped signal having an initial bit error rate (BER) of approximately $10^{-9}$ is degraded to a BER of approximately $10^{-2}$. FIG. 4a shows an eye diagram for a 10 Gbit per second non-return-to-zero (NRZ) optical signal at a channel wavelength of 1550 nm and modulated with traffic at a frequency of 193.4 THz. The OSNR of the signal is 14 dB and it has a BER of approximately $10^{-9}$.

Figure 4B:
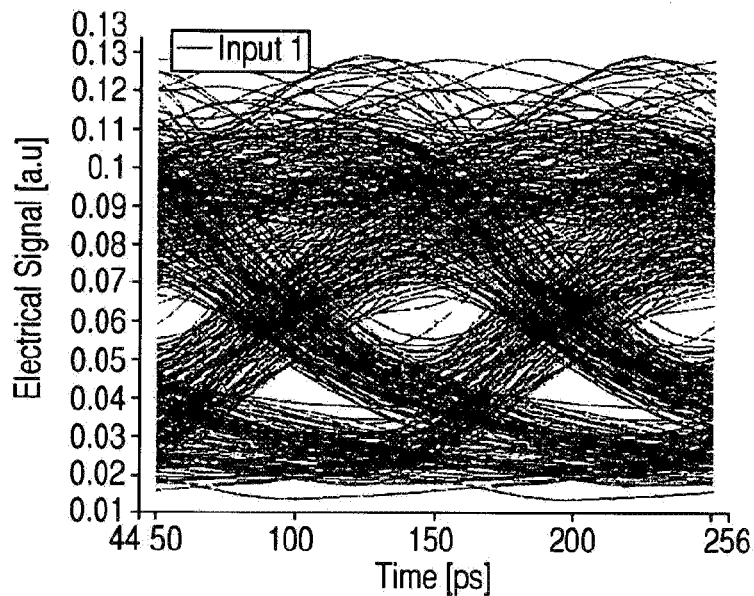

FIG. 4b shows an eye diagram of an optical monitoring signal formed by transmitting the tapped signal through the 1 km length of multimode fibre 42, with no offset launch. As can be seen, the eye diagram is degraded, indicating that time-domain obfuscation has been applied to the tapped signal on transmission through the multimode fibre.

Figure 4C:
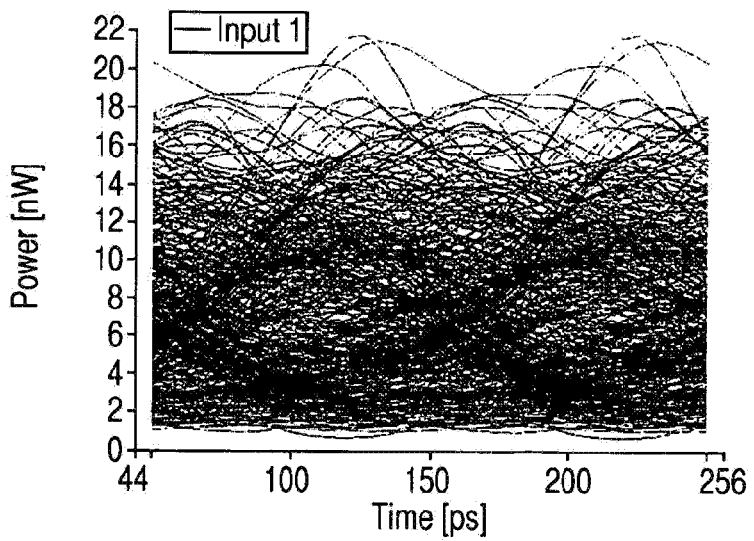

FIG. 4c shows an eye diagram for an optical monitoring signal formed by transmitting the same tapped signal through the 100 m length of the multimode fibre 42, using an offset launch of 30 micrometers. As can be seen, the eye diagram is completely degraded, now having a BER of approximately $10^{-2}$, with no signal modulation, and thus no traffic, being preserved.

The multimode fibre may alternatively be replaced by an optical fibre having high chromatic dispersion or high polarization mode dispersion characteristics, such that transmission of the tapped signal through the optical fibre applies chromatic dispersion or polarization mode dispersion to the tapped signal to thereby apply a time-domain obfuscation to the tapped signal.

A communications network element 50 according to a fourth embodiment of the invention is shown in FIG. 5. The communications network element 50 is substantially the same as the communications network element 30 of FIG. 2, with the following modifications. The same reference numbers are retained for corresponding features.

In this embodiment, the optical signal transforming apparatus 52 comprises an optical gate arranged to selectively gate a tapped signal. The optical gate 52 comprises an optical switch which is controlled by a controller 56 arranged to generate a chopping signal. The gate 52 is arranged to transmit the tapped signal for a measurement time and to block the tapped signal for a blocked time. The measurement time is short compared to the blocked time, so that the tapped signal is selectively gated for a small portion of the time during which the tapped signal is received. For example, the gate 52 may be operated to selectively gate a tapped signal for a measurement time of 10 ms every second. The measurement time is however much longer than the signal symbol duration of the tapped signal, so all of the spectral properties of the tapped signal are preserved in the optical monitoring signal gated through the gate 52.

The second optical signal transforming apparatus comprises a second gate 54 and a second controller 58 arranged to operate in the same manner as the first gate 52 and the first controller 56.

Figure 6:
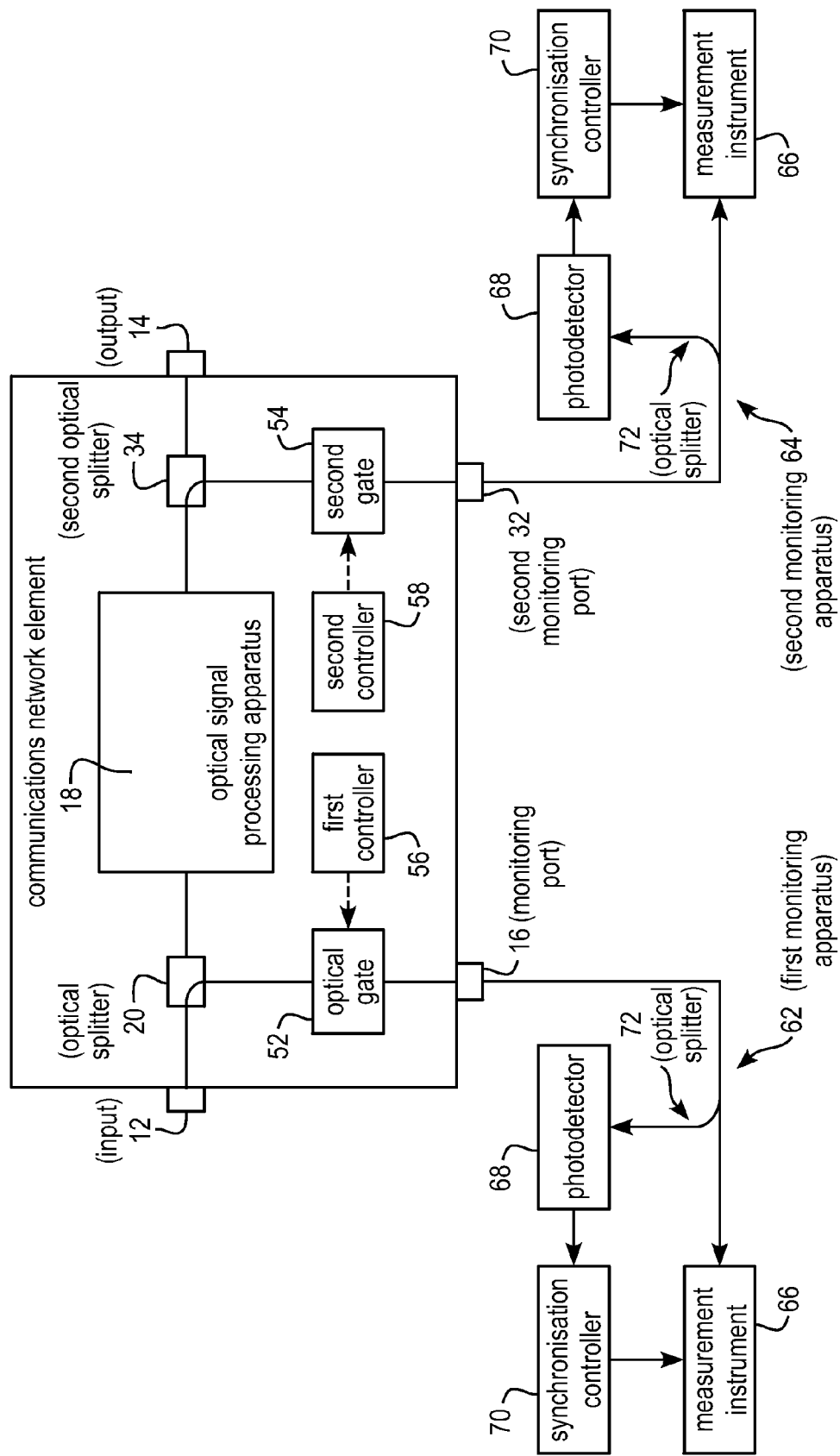
FIG. 6 is a diagrammatic representation of a communications network element according to a fifth embodiment of the invention.

A communications network element 60 according to a fifth embodiment of the invention is shown in FIG. 6. The communications network element 60 is substantially the same as the communications network element 50 of FIG. 5, with the following modifications. The same reference numbers are retained for corresponding features.

In this embodiment, the communications network element 60 further comprises a first monitoring apparatus 62 and a second monitoring apparatus 64. The first monitoring apparatus 62 is coupled to the first monitoring port 16 and the second monitoring apparatus is coupled to the second monitoring port 32. Each monitoring apparatus 62, 64 comprises a measurement instrument 66, a photodetector 68 and a synchronisation controller 70. An optical splitter 72 is provided to tap off a part of the received optical monitoring signal to deliver the tapped portion of the signal to the photodetector 68. The photodetector 68 is arranged to detect the presence or absence of the optical monitoring signal. The presence of an optical monitoring signal detected by the photodetector 68 communicated to the synchronisation controller 70. The synchronisation controller 70 is arranged to cause the measurement instrument 66 to trigger to measure an optical monitoring signal when its presence is detected by the photodetector 68. The monitoring apparatus 62, 64 is therefore arranged to trigger itself to measure the optical monitoring signal only when the optical monitoring signal is present, thereby self-synchronising with the gating of the tapped signal into the optical monitoring signal.

Figure 7:
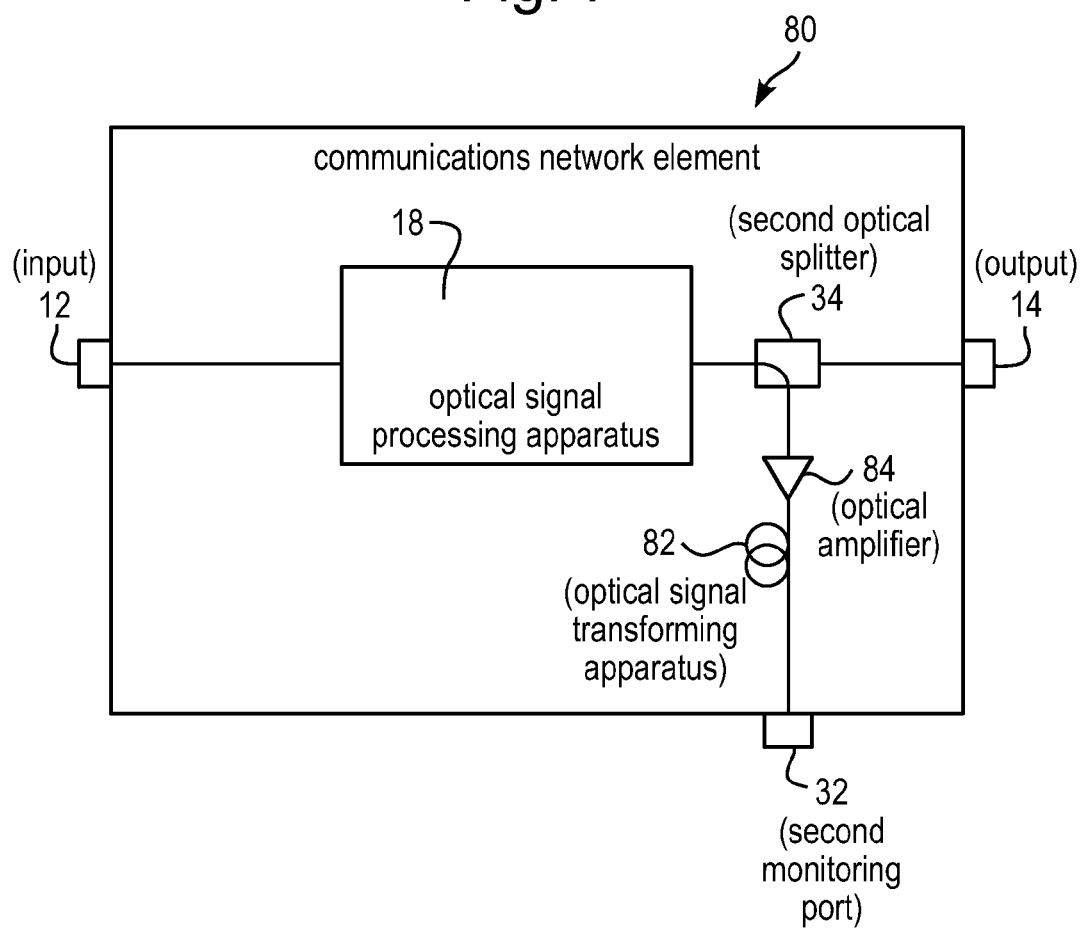
FIG. 7 shows the steps of a method of monitoring an optical signal in a communications network element according to a sixth embodiment of the invention.

A sixth embodiment of the invention provides a communications network element 80, as shown in FIG. 7. The communications network element 80 is substantially the same as the communications network element 30 of FIG. 2, with the following modifications. The same reference numbers are retained for corresponding features.

In this embodiment, an optical splitter 34, monitoring port 32 and optical signal transforming apparatus 82 are provided only on the output side of the optical signal processing apparatus 18.

The optical signal transforming apparatus of this embodiment comprises a nonlinear optical element in the form of an optical fibre 82 arranged to apply a nonlinear optical effect to the tapped signal. In this example, the nonlinear optical effect comprises the Kerr effect and the optical signal transforming apparatus further comprises an optical amplifier 84, arranged to amplify the tapped signal prior to delivery to the optical fibre 82. Transmission of the amplified tapped signal through the optical fibre 82 thereby applies a time-domain obfuscation to the tapped signal, with only the wavelength of the tapped signal being preserved. The resulting optical monitoring signal may be used to carry out channel detection and channel counting.

The Kerr effect may be manifested as four-wave mixing and self-phase modulation. The optical fibre 82 may alternatively be arranged to apply Brillouin scattering to the tapped signal.

Figure 9:
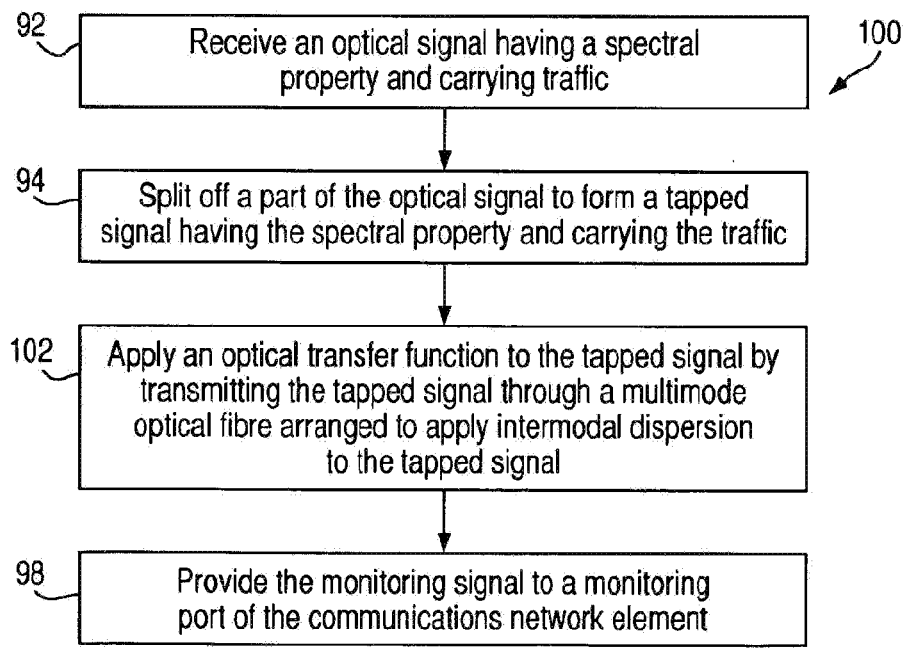
FIG. 9 shows the steps of a method of monitoring an optical signal in a communications network element according to an eighth embodiment of the invention.

FIG. 9 shows the steps of a method 90 of monitoring an optical signal in a communications network element, according to an eighth embodiment of the invention.

The method 90 comprises receiving an optical signal having a spectral property and carrying traffic 92. A part of the optical signal is split off to form a tapped signal having the spectral property and carrying the traffic 94. An optical transfer function is applied to the tapped signal to form a monitoring signal 96. The optical transfer function is arranged to preserve the spectral property and to apply the time-domain obfuscation to the tapped signal. The method further comprises providing the monitoring signal to a monitoring port of the communications network element 98.

Figure 8:
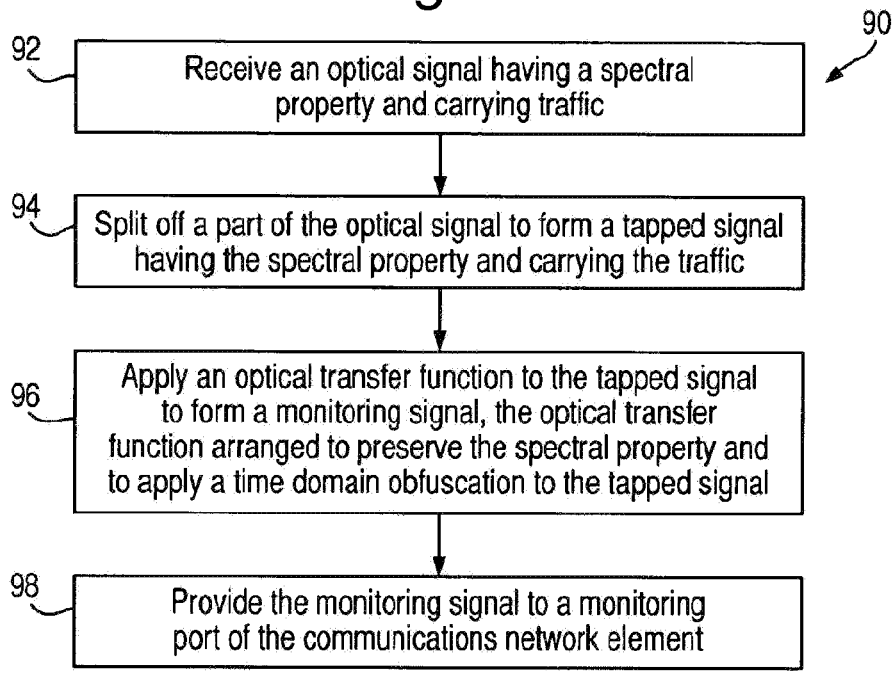
FIG. 8 shows the steps of a method of monitoring an optical signal in a communications network element according to a seventh embodiment of the invention.
Figure 10:
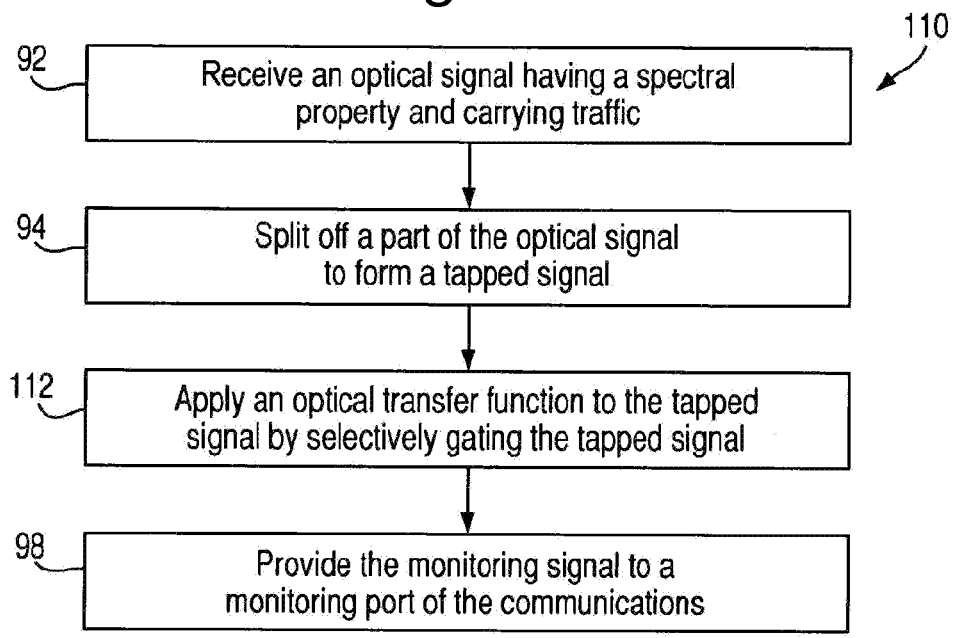
FIG. 10 shows the steps of a method of monitoring an optical signal in a communications network element according to a ninth embodiment of the invention.

A method 100 of monitoring an optical signal in a communications network element according to a ninth embodiment of the invention is shown in FIG. 10. The method 100 is substantially the same as the method 90 of FIG. 8, with the following modifications. The same reference numbers are retained for corresponding steps.

In this embodiment, the optical transfer function is applied by transmitting the tapped signal through a multimode optical fibre arranged to apply intermodal dispersion to the tapped signal 102.

Figure 11:
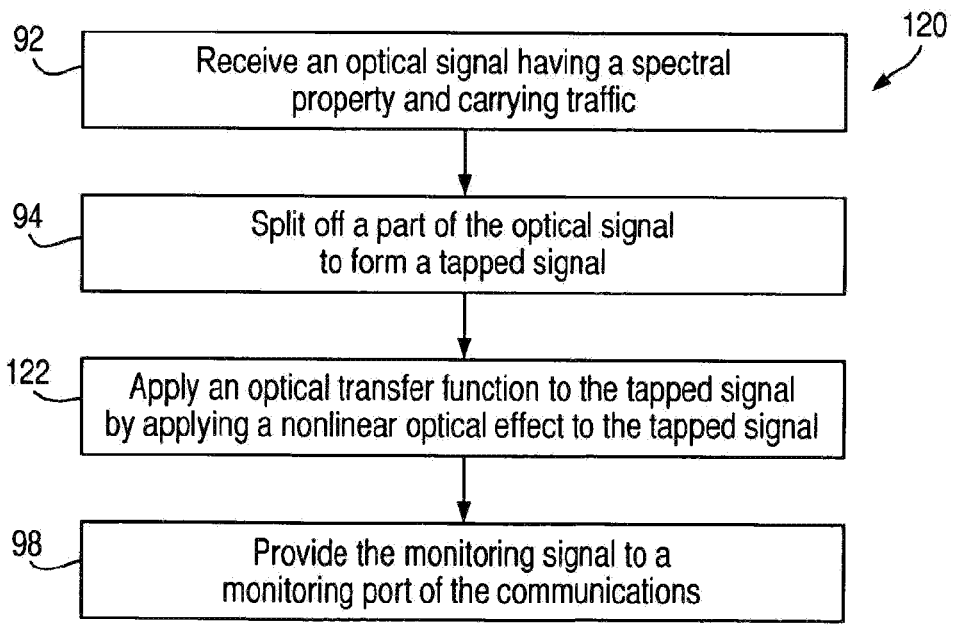
FIG. 11 shows the steps of a method of monitoring an optical signal in a communications network element according to a tenth embodiment of the invention.

FIG. 11 shows the steps of a method 110 of monitoring an optical signal in a communications network element, according to a tenth embodiment of the invention. The method 110 is substantially the same as the method 90 of FIG. 8, with the following modification. The same reference numbers are retained for corresponding steps.

In this embodiment, the optical transfer function is applied by selectively gating the tapped signal 112.

The steps of a method 120 of monitoring an optical signal in a communications network element, according to a tenth embodiment of the invention, are shown in FIG. 11. The method 120 is substantially the same as the method 90 of FIG. 8, with the following modification. The same reference numbers are retained for corresponding steps.

In this embodiment, the optical transfer function is applied to the tapped signal by applying a nonlinear optical effect to the tapped signal 122.

FIG. 12 shows the steps of a method 130 of manufacturing a communications network element, according to an eleventh embodiment of the invention.

An input 132 is provided, which is arranged to receive an input optical signal having an input spectral property incurring input traffic. An output is provided 134 and arranged to output an output optical signal. A monitoring port is provided 136 which is arranged to output an optical monitoring signal. The method further comprises providing optical signal processing apparatus 138, which is arranged to receive the input optical signal and to form the output optical signal. The output optical signal has an output spectral property and carries output traffic. An optical splitter is provided 140 which is arranged to tap off a part of one of the input optical signal and the output optical to form a tapped signal. The tapped signal has a spectral property comprising a respective one of the input spectral property and the output spectral property. The tapped signal carries traffic comprising a respective one of the input traffic and the output traffic.

The method 130 further comprises providing optical signal transforming apparatus 142 which is arranged to receive the tapped signal and to apply an optical transfer function to the tapped signal to form an optical monitoring signal. The optical transfer function is arranged to preserve the spectral property of the tapped signal and to apply a time-domain obfuscation to the tapped signal. The optical signal transforming apparatus is further arranged to provide the optical monitoring signal to the monitoring port.

The invention claimed is:

1. A communications network element comprising:
   an input arranged to receive an input optical signal having an input spectral property and carrying input traffic;
   an output arranged to output an output optical signal;
   a monitoring port arranged to output an optical monitoring signal;
   optical signal processing apparatus arranged to receive the input optical signal and to form the output optical signal, the output optical signal having an output spectral property and carrying output traffic;
   an optical splitter arranged to tap off a part of one of the input optical signal and the output optical signal to form a tapped signal having a spectral property comprising a respective one of the input spectral property and the output spectral property and carrying traffic comprising a respective one of the input traffic and the output traffic; and
   optical signal transforming apparatus arranged to receive the tapped signal and to apply an optical transfer function to the tapped signal to form an optical monitoring signal, the optical transfer function being arranged to preserve the spectral property of the tapped signal and to apply a time-domain obfuscation to the tapped signal that obfuscates traffic carried by the tapped signal thereby making it difficult or impossible for traffic on the tapped signal to be intercepted, and the optical signal transforming apparatus being further arranged to provide the optical monitoring signal to the monitoring port,
   wherein the optical signal transforming apparatus is arranged to apply one of intermodal dispersion, chromatic dispersion and polarisation mode dispersion to the tapped signal, and
   wherein the optical signal transforming apparatus comprises a multimode optical fibre arranged to apply intermodal dispersion to the tapped signal.

2. A communications network element as claimed in claim 1, wherein the input spectral property and the output spectral property comprise one of optical power, power spectral density, wavelength, frequency, and optical signal-to-noise ratio.

3. A communications network element as claimed in claim 1, wherein the optical signal transforming apparatus comprises an all-optical device arranged to apply the optical transfer function.

4. A communications network element comprising:
   an input arranged to receive an input optical signal having an input spectral property and carrying input traffic;
   an output arranged to output an output optical signal;
   a monitoring port arranged to output an optical monitoring signal;
   optical signal processing apparatus arranged to receive the input optical signal and to form the output optical signal, the output optical signal having an output spectral property and carrying output traffic;
   an optical splitter arranged to tap off a part of one of the input optical signal and the output optical signal to form a tapped signal having a spectral property comprising a respective one of the input spectral property and the output spectral property and carrying traffic comprising a respective one of the input traffic and the output traffic; and
   optical signal transforming apparatus arranged to receive the tapped signal and to apply an optical transfer function to the tapped signal to form an optical monitoring signal, the optical transfer function being arranged to preserve the spectral property of the tapped signal and to apply a time-domain obfuscation to the tapped signal that obfuscates traffic carried by the tapped signal thereby making it difficult or impossible for traffic on the tapped signal to be intercepted, and the optical signal transforming apparatus being further arranged to provide the optical monitoring signal to the monitoring port,
   wherein the optical signal transforming apparatus comprises an optical gate arranged to selectively gate the tapped signal.

5. A communications network element as claimed in claim 4, wherein the input spectral property and the output spectral property comprise one of optical power, power spectral density, wavelength, frequency, and optical signal-to-noise ratio.

6. A communications network element as claimed in claim 4, wherein the optical signal transforming apparatus comprises an all-optical device arranged to apply the optical transfer function.

7. A communications network element comprising:
   an input arranged to receive an input optical signal having an input spectral property and carrying input traffic;
   an output arranged to output an output optical signal;
   a monitoring port arranged to output an optical monitoring signal;
   optical signal processing apparatus arranged to receive the input optical signal and to form the output optical signal, the output optical signal having an output spectral property and carrying output traffic;
   an optical splitter arranged to tap off a part of one of the input optical signal and the output optical signal to form a tapped signal having a spectral property comprising a respective one of the input spectral property and the output spectral property and carrying traffic comprising a respective one of the input traffic and the output traffic; and
   optical signal transforming apparatus arranged to receive the tapped signal and to apply an optical transfer function to the tapped signal to form an optical monitoring signal, the optical transfer function being arranged to preserve the spectral property of the tapped signal and to apply a time-domain obfuscation to the tapped signal that obfuscates traffic carried by the tapped signal thereby making it difficult or impossible for traffic on the tapped signal to be intercepted, and the optical signal transforming apparatus being further arranged to provide the optical monitoring signal to the monitoring port,
   wherein the optical signal transforming apparatus comprises a nonlinear optical element arranged to apply a nonlinear optical effect to the tapped signal.

8. A communications network element as claimed in claim 7, wherein the input spectral property and the output spectral property comprise one of optical power, power spectral density, wavelength, frequency, and optical signal-to-noise ratio.

9. A communications network element as claimed in claim 7, wherein the optical signal transforming apparatus comprises an all-optical device arranged to apply the optical transfer function.

10. A method of monitoring an optical signal in a communications network element, the method comprising:
   receiving an optical signal having a spectral property and carrying traffic;
   splitting off a part of the optical signal to form a tapped signal having the spectral property and carrying the traffic;
   applying an optical transfer function to the tapped signal to form an optical monitoring signal, the optical transfer function being arranged to preserve the signal property of the tapped signal and to apply a time-domain obfuscation to the tapped signal that obfuscates traffic carried by the tapped signal thereby making it difficult or impossible for traffic on the tapped signal to be intercepted; and
   providing the optical monitoring signal to a monitoring port of the communications network element,
   wherein applying the optical transfer function comprises applying one of intermodal dispersion, chromatic dispersion and polarisation mode dispersion to the tapped signal,
   wherein the intermodal dispersion is applied by transmitting the tapped signal through a multimode optical fibre arranged to apply intermodal dispersion to the tapped signal.

11. A method as claimed in claim 10, wherein the spectral property comprises one of optical power, power spectral density, wavelength, frequency, and optical signal-to-noise ratio.

12. A method as claimed in claim 10, wherein the optical transfer function is applied by transmitting the tapped signal through an all-optical device arranged to apply the optical transfer function.

13. A method of monitoring an optical signal in a communications network element, the method comprising:
   receiving an optical signal having a spectral property and carrying traffic;
   splitting off a part of the optical signal to form a tapped signal having the spectral property and carrying the traffic;
   applying an optical transfer function to the tapped signal to form an optical monitoring signal, the optical transfer function being arranged to preserve the signal property of the tapped signal and to apply a time-domain obfuscation to the tapped signal that obfuscates traffic carried by the tapped signal thereby making it difficult or impossible for traffic on the tapped signal to be intercepted; and
   providing the optical monitoring signal to a monitoring port of the communications network element,
   wherein applying the optical transfer function comprises selectively gating the tapped signal.

14. A method as claimed in claim 13, wherein the spectral property comprises one of optical power, power spectral density, wavelength, frequency, and optical signal-to-noise ratio.

15. A method as claimed in claim 13, wherein the optical transfer function is applied by transmitting the tapped signal through an all-optical device arranged to apply the optical transfer function.

16. A method of monitoring an optical signal in a communications network element, the method comprising:
   receiving an optical signal having a spectral property and carrying traffic;
   splitting off a part of the optical signal to form a tapped signal having the spectral property and carrying the traffic;
   applying an optical transfer function to the tapped signal to form an optical monitoring signal, the optical transfer function being arranged to preserve the signal property of the tapped signal and to apply a time-domain obfuscation to the tapped signal that obfuscates traffic carried by the tapped signal thereby making it difficult or impossible for traffic on the tapped signal to be intercepted; and
   providing the optical monitoring signal to a monitoring port of the communications network element,
   wherein applying the optical transfer function comprises applying a nonlinear optical effect to the tapped signal.

17. A method as claimed in claim 16, wherein the spectral property comprises one of optical power, power spectral density, wavelength, frequency, and optical signal-to-noise ratio.

18. A method as claimed in claim 16, wherein the optical transfer function is applied by transmitting the tapped signal through an all-optical device arranged to apply the optical transfer function.

19. A non-transitory data carrier having computer readable instructions embodied therein, the said computer readable instructions being for providing access to resources available on a processor and comprising instructions to cause the processor to cause an optical transfer function to be applied to a tapped optical signal to form an optical monitoring signal, the tapped optical signal having a spectral property and carrying traffic, the optical transfer function being arranged to preserve the spectral property of the tapped signal and to apply a time-domain obfuscation to the tapped signal that obfuscates traffic carried by the tapped signal thereby making it difficult or impossible for traffic on the tapped signal to be intercepted,
   wherein causing the optical transfer function to be applied comprises one of:
      causing intermodal dispersion to be applied by transmitting the tapped signal through a multimode optical fibre arranged to apply intermodal dispersion to the tapped signal;
      causing the tapped signal to be selectively gated; and
      causing a nonlinear optical effect to be applied to the tapped signal.

* * * * *